US008477596B2

(12) United States Patent
Trisno et al.

(10) Patent No.: US 8,477,596 B2
(45) Date of Patent: Jul. 2, 2013

(54) APPLICATION OF HARDWARE-BASED MAILBOXES IN NETWORK TRANSCEIVERS AND DISTRIBUTED APPROACH FOR PREDICTABLE SOFTWARE-BASED PROTECTION SWITCHING

(75) Inventors: Tjandra Trisno, San Jose, CA (US); Edward E. Sprague, Woodside, CA (US); Scott A. Young, Scotts Valley, CA (US)

(73) Assignee: Infinera Corporation, Sunnyvale, CA (US)

(*) Notice: Subject to any disclaimer, the term of this patent is extended or adjusted under 35 U.S.C. 154(b) by 451 days.

(21) Appl. No.: 11/669,151

(22) Filed: Jan. 30, 2007

(65) Prior Publication Data

US 2007/0211742 A1   Sep. 13, 2007

Related U.S. Application Data

(60) Provisional application No. 60/763,251, filed on Jan. 30, 2006.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)

(52) U.S. Cl.
USPC .......................................... 370/217; 370/228

(58) Field of Classification Search
None
See application file for complete search history.

(56) References Cited

U.S. PATENT DOCUMENTS

| 5,003,531 | A   | 3/1991  | Farinholt et al. |
| 5,069,521 | A   | 12/1991 | Hardwick |
| 5,299,293 | A   | 3/1994  | Mestdagh et al. |
| 5,457,555 | A   | 10/1995 | Moriyama |
| 6,049,523 | A   | 4/2000  | Anderson et al. |
| 6,307,986 | B1  | 10/2001 | Duerksen et al. |
| 6,690,644 | B1  | 2/2004  | Gorshe |
| 6,718,084 | B1* | 4/2004  | Wang ............................ 385/17 |
| 6,751,699 | B1* | 6/2004  | Langley et al. ............... 710/317 |
| 6,856,594 | B1  | 2/2005  | Hayami et al. |
| 6,856,600 | B1* | 2/2005  | Russell et al. ................ 370/244 |
| 6,859,430 | B1* | 2/2005  | Frank et al. ................... 370/216 |
| 6,879,559 | B1* | 4/2005  | Blackmon et al. ............ 370/225 |
| 6,904,542 | B2* | 6/2005  | Ryhorchuk et al. ........... 714/27 |

(Continued)

OTHER PUBLICATIONS

G. Xue, W. Zhang, J. Tang, K. Thulasiraman, Establishment of Survivable Connections in WDM Networks using Partial Path Protection, pp. 1756-1760, 2005.*

*Primary Examiner* — John Blanton
*Assistant Examiner* — Christopher Crutchfield
(74) *Attorney, Agent, or Firm* — North, Weber & Baugh LLP; David L. Soltz

(57) ABSTRACT

A line card in a network node having a local memory coupled to a local controller and local logic circuit. The local memory in the line card stores state information for signals processed by the line card itself, as well as state information for signals processed by other line cards. The logic circuit and controller implement a same fault detection and signal processing algorithms as all other line cards in the group, to essentially effectuate a distributed and local hardware based control of automatic protection switching (APS) without interrupting a central processor. The line card also performs error checking and supervisory functions to ensure consistency of state among the line cards.

6 Claims, 7 Drawing Sheets

U.S. PATENT DOCUMENTS

| | | | |
|---|---|---|---|
| 7,072,584 B1 * | 7/2006 | Lichtman et al. | 398/59 |
| 7,212,739 B2 * | 5/2007 | Graves et | 398/5 |
| 7,398,018 B2 * | 7/2008 | Ohara | 398/5 |
| 7,543,096 B2 * | 6/2009 | Davies | 710/268 |
| 2002/0126350 A1 | 9/2002 | Sato et al. | |
| 2002/0141332 A1 * | 10/2002 | Barnard et al. | 370/218 |
| 2002/0171886 A1 | 11/2002 | Wu et al. | |
| 2002/0191538 A1 | 12/2002 | Ono | |
| 2003/0043736 A1 * | 3/2003 | Gonda | 370/218 |
| 2003/0163555 A1 * | 8/2003 | Battou et al. | 709/223 |
| 2004/0179472 A1 * | 9/2004 | Khalilzadeh et al. | 370/227 |
| 2004/0208118 A1 | 10/2004 | DeBoer et al. | |
| 2005/0021628 A1 * | 1/2005 | Johansson | 709/205 |
| 2005/0094553 A1 * | 5/2005 | Zhou et al. | 370/217 |
| 2005/0243716 A1 * | 11/2005 | Bitar et al. | 370/218 |

* cited by examiner

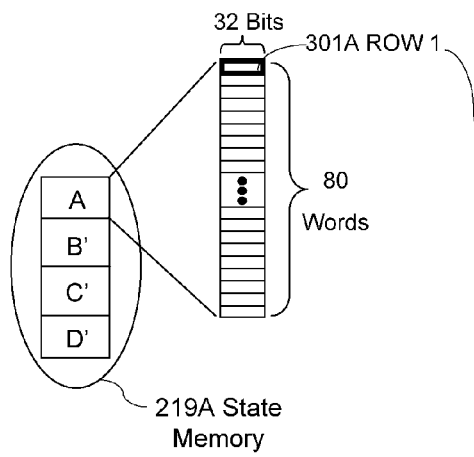
*Fig. 3A*
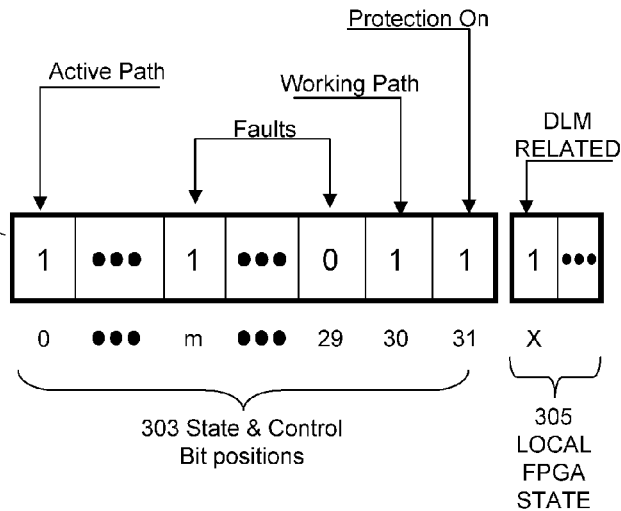
*Fig. 3B*
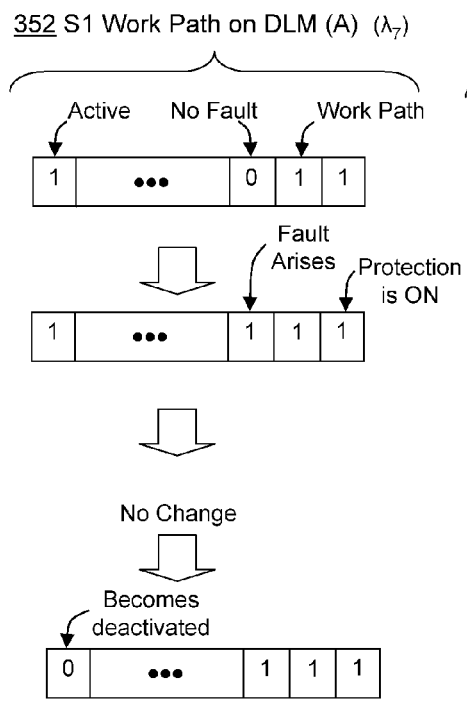
*Fig. 3C*
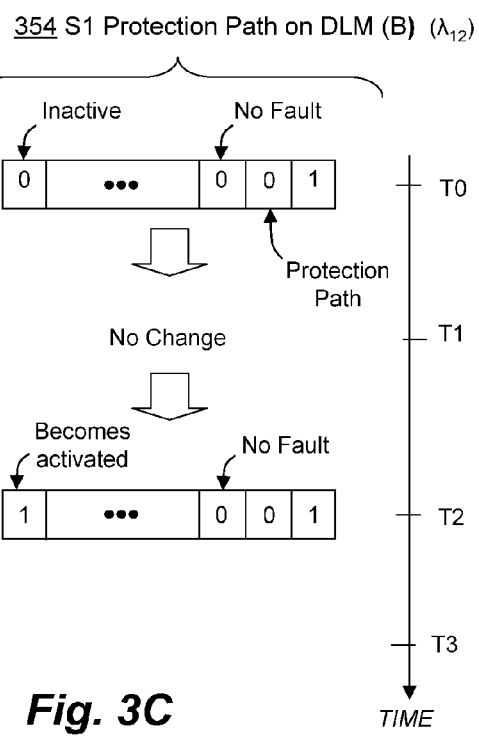

APPLICATION OF HARDWARE-BASED MAILBOXES IN NETWORK TRANSCEIVERS AND DISTRIBUTED APPROACH FOR PREDICTABLE SOFTWARE-BASED PROTECTION SWITCHING

CROSS REFERENCE TO RELATED PATENT APPLICATIONS

This application claims priority to U.S. Provisional Application Ser. No. 60/763,251, entitled "Application of hardware-based mailboxes in network transceivers and Distributed approach for Predictable Software-Based Protection Switching," filed Jan. 30, 2006, which application is incorporated herein by reference in its entirety.

BACKGROUND OF THE INVENTION

1. Field of the Invention

This invention relates generally to network protection systems and more particularly to protection schemes for such systems to provide protection switching for optical signals in an optical transport network.

2. Description of the Related Art

For high-reliability signals, such as those used in telecommunications and data communications, duplicate versions of the signal are routed through the network, e.g., optical such as a synchronous optical network (SONET), via different paths, referred to as a working path and a protection, or standby, path. Thus for a given signal transmitted on one path, the duplicate path will be the complement of the first path, e.g., if the first path is a working path then the second path is the protection path, or vice versa. Such duplicate paths are created at initialization to capture network resources for routing the signal through different nodes and/or different fiber links in the network. In this manner, if a failure occurs in a given path, e.g., a laser failure in a node or a fiber breakage between nodes, then a duplicate version of the signal already exists in the network, and only requires a simple switching from one path to the other at a junction point in order to continue the progress of the signal. While the cost of duplicate routing is the consumption of bandwidth, the benefit is protection from a loss of service.

There are multiple types of protection schemes, including mesh, dedicated, and shared. In a shared protection scheme, the signal is transmitted on only one path, e.g., the working path, while the complementary path, e.g., the protection path, is simply set up for one or more signals without actively transmitting a signal on the path until a fault arises in the one or more working path signals. In this manner, the shared redundant routing conserves routing bandwidth and allows the protection path to be shared among multiple working channels. However shared redundant routing may suffer from longer switchover times because of latency in the transmission of control information. Dedicated redundant routing overcomes these limitations by constantly communicating the signal on both the working and protection path, albeit at the cost of consuming bandwidth.

Both the working and protection path will provide a signal received at a node. However, the signal from only one of those paths is chosen for transmission out of the node, e.g., to either a downstream node in the network, to an adjacent network, or to an out-of-network client. The path whose signal is chosen for subsequent transmission out of the node is referred to as a so-called active path. The working path may initially be designated as the active path, but the protection path may subsequently be assigned the active path state, leaving the working path in an inactive state. This switching, referred to as Automatic Protection Switching (APS), may toggle the active state back and forth between the working and protection path as necessary to reliably transmit the signal in the network.

In order to minimize disruption of the signal, a need arises to provide the APS function as quickly and reliably as possible. Every millisecond of interruption means the loss of potentially valuable data. If a control-plane based communication system for optical communication networks, or systems, utilizes software-software communication with a software protocol stack, e.g., on an Ethernet infrastructure, for protective, or active, switching, then multiple software layers may be required for message generation, transmission, receipt, and interpretation. In turn, multiple software layers in a software-based protective switch engine may be slower and less predictable than hardware based protective switching architecture. Consequently, a need arises to overcome the latency and unpredictability of a software-software based APS implementation.

If a system utilizes a control scheme that is "hard-wired" or based solely on a hardware mechanism for controlling APS, it might provide faster switching than software based solutions. However, a typical limitation with hardware solutions might arise, that of inflexibility in the choices of which ports are associated in the protection scheme and which protection algorithms are applied. Consequently, a need arises for a fast protection based switching that also has flexibility in signal routing and protection algorithms.

These aforementioned needs arise for traditional electronic based communication networks, as well as optical based networks, such as optical dense or coarse wavelength division multiplexing (DWDM) (CWDM) systems.

SUMMARY OF THE INVENTION

According to this invention, automatic protection switching (APS) is quickly and reliably performed on redundant signal paths processed by a plurality of line cards, so-called digital line modules (DLMs), in a network node. Each line card contains a local memory coupled to a local controller and a local logic circuit. The local memory in the line card, also referred to as a mailbox (mbox), stores state information for signals processed by the line card itself, as well as state information for signals processed by other line cards, e.g., cards that process a working or protection path of the same signal. By storing the state of all the signals processed by all the line cards, the individual line card can locally and autonomously decide the control state of the signals processed on its line card, using local logic circuits and interrupts to its own local controller, all without interrupting a central controller, e.g., a shelf controller that might have management functions for multiple DLMs and/or other resources at the node. Each line card implements the same algorithms on their local logic circuit and local controller for fault management and protection switching. Consequently, the system of line cards controls, at a line-card level, the protective switching of paths managed by the line card itself, even though a different line card processes a complementary path of the same signal. And the line card accomplishes all this without using or interrupting a higher-level central processor, e.g., to process a software stack, arbitrate any conflicts or handoffs, etc., thereby conserving host processor resources and reducing latency. The local memory, local logic circuits, and output and input ports for communicating state information between line cards is implemented in a field programmable gate array (FPGA) in the present embodiment.

Overall, the deployment of state memory, or mailboxes, in each of the DLMs with states of all DLMs allows the distributed software and firmware to be very concise in evaluating the current state of each individual DLM, allowing it to be run in a single context, reducing the operating system overhead as well as making the state mechanism highly predictable. By reviewing the replicated state from different DLMs in each DLM, the line card can perform error checking and supervisory functions to ensure consistency of state among the line cards. The protection switching system needed to provide for cable protection to DLMs can satisfy a required 50 millisecond switching time in a worst-case scenario.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3A is a detail illustration of the partitioning layout of a state memory portion of a line card.

FIG. 3B is a detail illustration of a row of state memory with exemplary state value bit settings.

FIG. 3C is a detail illustration of two rows of state memory, for a working path and a protection path, as they progress through state changes over time to effectuate protective path switching.

DETAILED DESCRIPTION OF THE PREFERRED EMBODIMENTS

Figure 1:
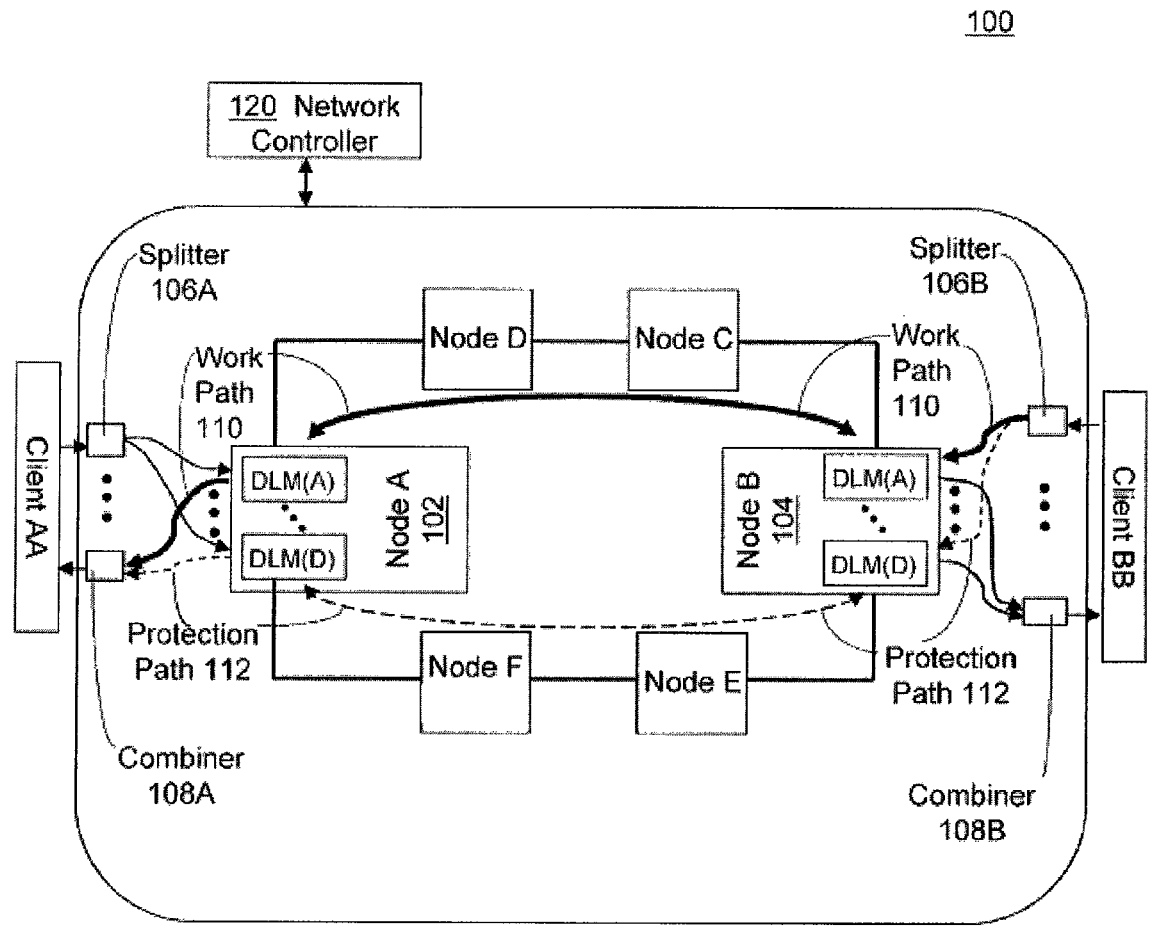
FIG. 1 is schematic illustration of a communication network utilizing protection paths in which this invention may be employed.

Reference is first made to FIG. 1 that illustrates a communication network 100 utilizing protection paths, in which this invention may be employed. In FIG. 1, a signal to be transmitted between client AA at node A 102 to client BB at node B 104, via both a working path 110 through nodes C and D, and a redundant protection path 112 though nodes E and F.

Redundant paths are created at both nodes A 102 and B 104 by the use of a splitter 106A and 106B, respectively. Thus a given client signal is replicated and sent into the line card of the node for transmission over the working path and the protection path. Similarly a given client signal transmitted over multiple paths, e.g., the working path and protection path, is combined at a junction, e.g., via combiners 108A and 108B at nodes A and B respectively, either for egressing the network to a client, or for progressing from one node to the next within the same network. The node controls which of the received redundant paths actually transmits to the combiner either by turning off a laser or by some other method of disabling transmission. Network controller 120 is utilized for management operations of the nodes in the network and potentially for configuring the protection mode and associated protection channels at initialization. However, in the present disclosure, the network controller is not involved at the time of the actual protection path switch, e.g., between the working path 110 and the protection path 112 in this example, other than configuring the circuits which are to be associated for protection. By managing protection path switching with resources other than the network controller 120, the present disclosure conserves resources of network controller 120 and decreases the latency of the switchover.

While the present disclosure illustrates a unidirectional path protective switching, wherein the protection paths are chosen and managed separately for traffic in each direction, the present invention is well suited to application in a bi-directional path protection switching, where both directions of traffic for a signal are linked together on the same path. In a bi-directional embodiment, relationships between working and protection paths in both directions will have to be maintained in FPGA state memory, local controller LUT, and in states shared between DLMs. In other words, if a working or protection path in either direction has a fault, the states of the four total signals may be affected by a protection switching.

The present invention is well suited to alternative embodiments. For example, while the splitter and combiner for the working and protection paths of a signal are shown external of the DLM and the node, in an alternative embodiment, they may be integrated within a DLM line card within the node. Also, the existence of a fault detected at a local node may be transmitted to a remote node by disabling the reverse signal. Finally, an alternative embodiment may utilize an M:N relationship, rather than a default 1:1 relationship, between a wavelength received by a node, e.g., the long haul signal input to a node, and the signal subsequently transmitted from the node, e.g., a signal transmitted from the node to the combiner, e.g., combiner 108B on its way to a client AA. For example, the signal transmitted from the node to the combiner may only be a portion of the received wavelength subject to protection switching. Hence a failure in a received wavelength may cause the switching of multiple transmitted signals to the combiner.

Figure 2A:
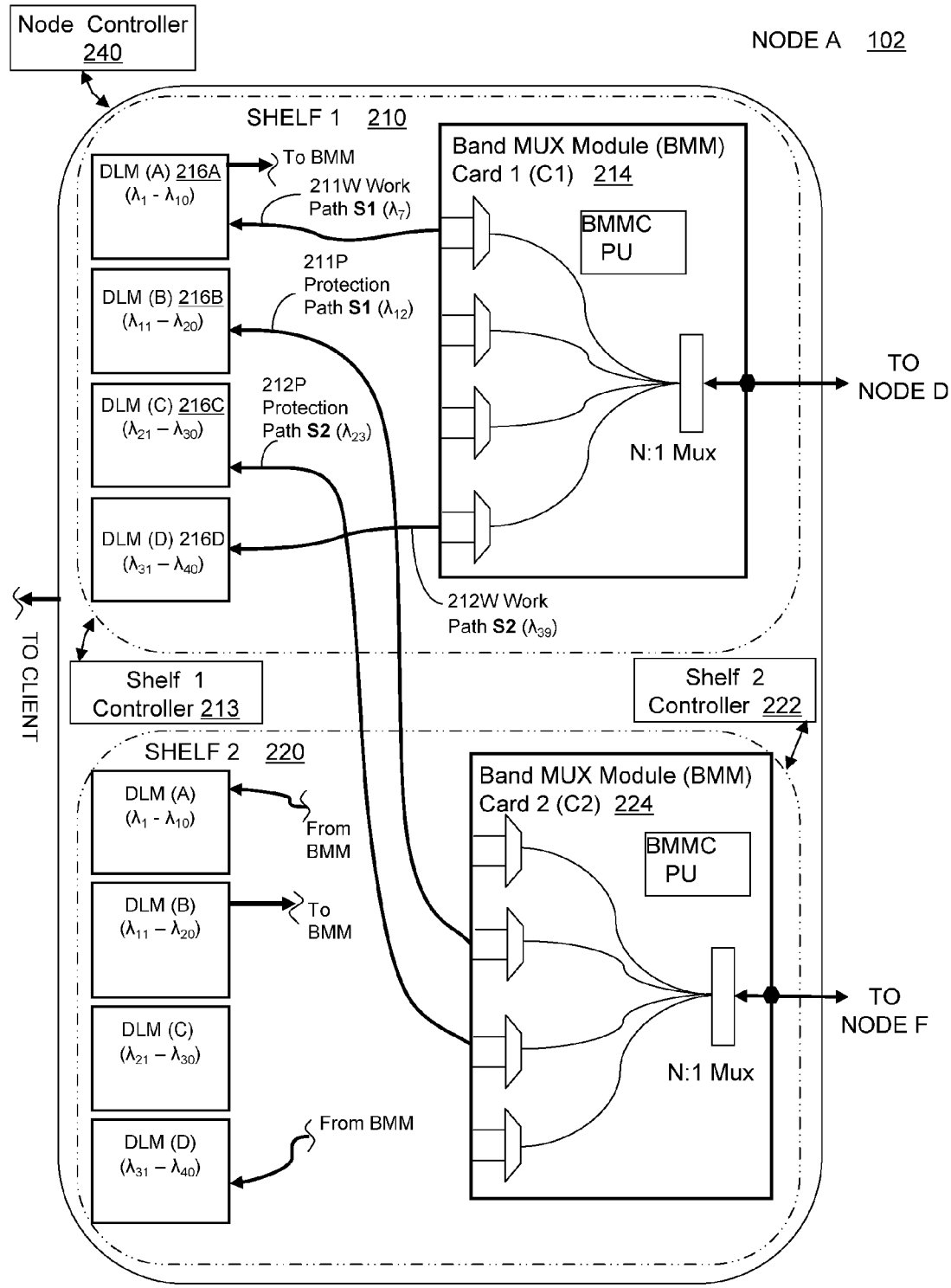
FIG. 2A is a schematic illustration of a plurality of line cards, DLMs (A) through (D), having working path and protection path coupling to multiple band multiplexer/demultiplexer modules (BMMs) in a node for protective path switching.

Referring now to FIG. 2A, a schematic illustration of a plurality of line cards, DLMs (A) through (D) for node A 102, having working path and protection path coupling to multiple band multiplexer/demultiplexer modules (BMMs) in a node for protective path switching, is shown. This example illustrates the redundant paths for two different client signals, for showing different coupling arrangements, though the present disclosure is well suited to a wide range of coupling arrangements.

Node A 102 utilizes two different sets of DLMs and band mux modules (BMMs), arranged in a grouping called a 'shelf,' e.g., an individual chassis, and slated for a given node, e.g., shelf 1 210 slated for node D and shelf 2 220 slated for node F. Shelf 1 210 includes DLM (A) 216A spanning wavelengths $\lambda_1$ through $\lambda_{10}$, DLM (B) 216B spanning $\lambda_{11}$ through $\lambda_{20}$, DLM (C) 216C spanning $\lambda_{21}$ through $\lambda_{30}$, and DLM (D) spanning $\lambda_{31}$ through $\lambda_{40}$, coupled to a band mux module (BMM) card C1 214, and controlled by shelf 1 controller 213. Similarly, shelf 2 220 has a parallel arrangement of DLMs coupled to its BMM card C2 224 as controlled by shelf 2 controller 222. The wavelengths shown for each DLM are interleaved, and referred to as an optical carrier group (OCG), but they may be contiguous in another embodiment. Each BMM has its internal controller, or CPU, coupled to its stages of multiplexing and interleaving elements for the transmission path, and its stages of demultiplexing and deinterleaving elements for the reception path of signals. Thus, the protective path switching performed on signals received from either nodes D or F may be managed by node A 102 for subsequent routing to the client or to node F or D, respectively.

For signal S1, a working path 211W, corresponding to working path 110 of FIG. 1, is routed on wavelength $\lambda_7$ from node D into node A 102 via BMM C1 214 and DLMs in shelf 1 210, while protection path 211P for signal S1, corresponding to protection path 112 of FIG. 1, is routed on wavelength $\lambda_{12}$ from node F into node A 102 via BMM C2 224 and DLMs in shelf 2 220. The protection paths cross from one shelf to another via an optical patch cord or by any other means of locally transmitting from one shelf, or chassis, to another. Signals processed by BMM C2 224 in shelf 1 210 are coupled to DLMs in Shelf 1 210 by optically coupling between the two shelves, on an OCG granularity basis, e.g., the signals from an entire DLM have to be routed together.

Similarly for signal S2, a client signal separate from S1, a working path 212W, corresponding to working path 110 of FIG. 1, is routed on $\lambda_{39}$ from node D into node A 102 via BMM C1 214 and DLMs in shelf 1 210, while protection path 212P for signal S2, corresponding to protection path 112 of FIG. 1, is routed on wavelength $\lambda_{23}$ from node F into node A 102 via BMM C2 224 and DLMs in shelf 2 220. Typically, protection path and working paths are routed on different nodes, e.g., nodes D and F, providing signals to a given junction point, e.g., node A 102, thereby requiring two separate BMMs to process the same network range of signal bands on nodes D and F. Because the present example illustrates protective switching only for received signals, only the receiver hardware is shown for the BMMs of FIG. 2A, while transmitter hardware, for sake of clarity is omitted.

The node controller 240, shelf controllers 213 and 222, network controller 120, or other controller outside of a line card/DLM, can be termed a central controller, or processor, to a DLM. It is these controllers' resources that the local and distributed APS implementation of the present disclosure seeks to conserve.

As an alternative to the present embodiment, the signals that are output from the BMM may be processed by any line card in the node that can be coupled to the BMM. Thus, while all the protection and working paths for signals S1 and S2 are processed by DLMs in shelf 1 210 in the present embodiment, a different embodiment may process these paths by DLMs in shelf 2 220, with subsequent routing of the signals that are output from the DLMs to the respective client. Routing software used at initialization can provide the necessary connectivity between the appropriate DLMs and clients. For example, protection path 212P for signal S2 is coupled from DLM (C) 216C to DLM (D) 216D in shelf 1 220 for load sharing purposes. Similarly, protection paths for signals S1 and S2 could have both been processed by DLMs in shelf 2 220 in another embodiment. While the splitter and combiner for the working and protection path signals was not located on the shelf card, as shown in FIG. 1, the present invention is well suited to integrate the splitter and combiner functionality on the module or may be a separate component in the DLM. While the present embodiment utilizes groupings of line cards in 'shelves', the present invention is well-suited to utilizing any other grouping of line cards.

Figure 2B:
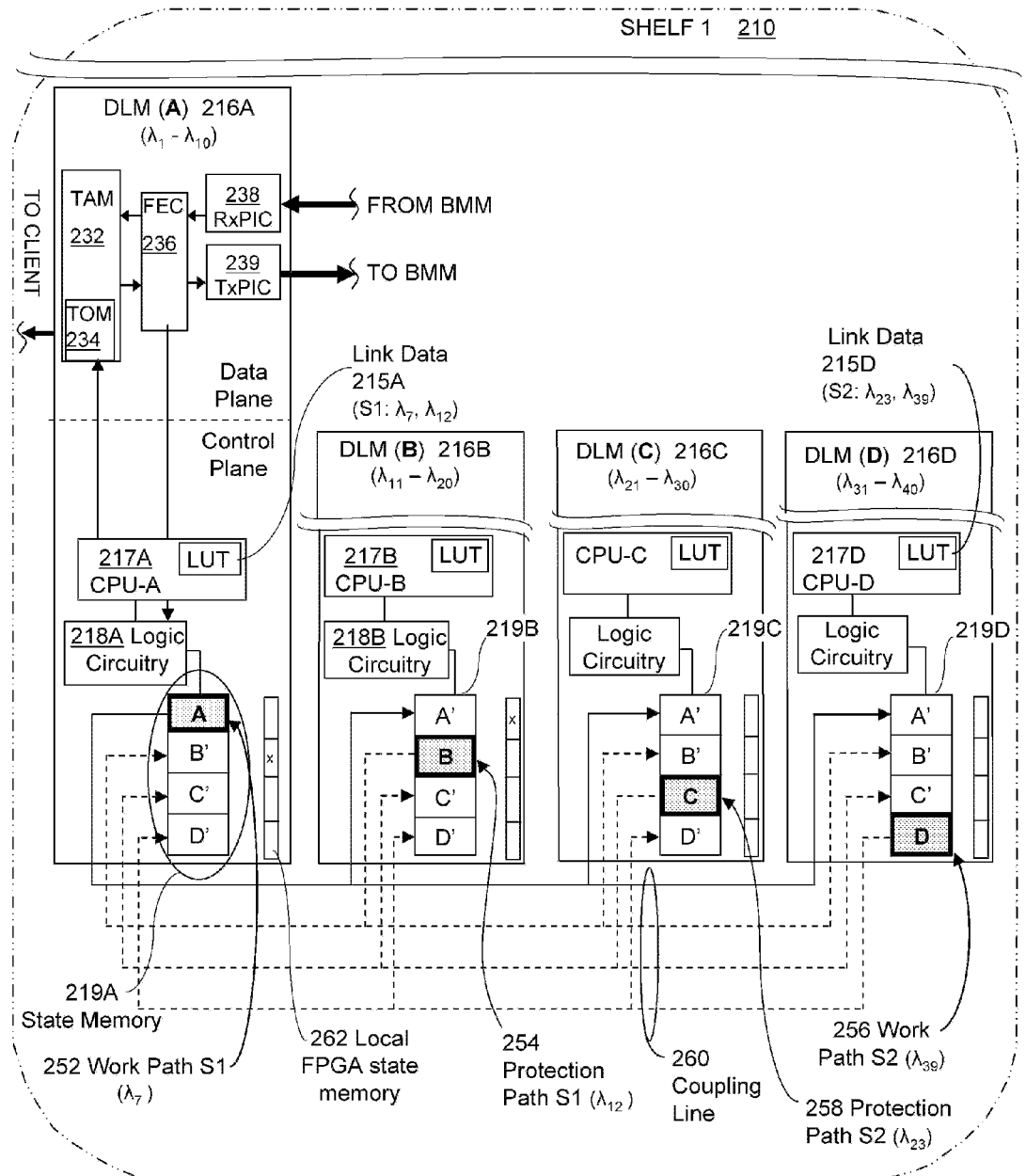
FIG. 2B is a schematic illustration of state memory architecture in a plurality of line cards that allow replication of states of multiple line cards within each line card.

Reference is now made to FIG. 2B that shows a schematic illustration of state memory architecture in a plurality of line cards, or DLMs, that allow replication of states of multiple line cards within each line card. Representative DLM (A) 216A includes detailed components of both the control plane section and the data plane section.

In the control plane section, local logic circuitry 218A is coupled to local state memory 219A and local CPU 217A. The state memory 219A is partitioned to accommodate state information for signals from multiple DLM line cards. Thus, state memory 219A is partitioned into four blocks, each referred to as a mailbox (mbox), one for each line card, and labeled with the DLM line card's letter. In particular, mailbox A, shown in dark outline, stores the state information for signals processed by the DLM (A) 216A. The remaining partitions of state memory 219A, labeled B', C' and D', are used to store corresponding state information from the remaining DLMs, e.g., for DLM (B) 216B, DLM (C) 216C, and DLM (D) 216D, respectively. The state information from other DLMs is referred to as 'shadow memory' versions of the state information from the other DLMs. This is because a local DLM has the most up-to-date state information for the signals it is processing, while there is a slight delay in the communication of these states from the present DLM to the balance of the DLMs.

As an example for the protection path provided for the two signals in previous figures, state information for working path S1 211W of FIG. 2A is processed and stored in row 252 of state memory 219A of DLM (A) 216, and copied to shadow memory locations on the remaining DLMs (B)-(D) representing the state information of signals processed by DLM (A) 216. For example, the state information associated with the signals processed by DLM (A) 216A is copied to, or otherwise stored in, mailbox A' of the remaining state memories 219B-D. Similarly, state information for signal S1 protection path is initially stored in row 254 of partition B of state memory 219B in DLM (B) 216B, and then copied into the shadow memory of mailboxes B' in the balance of associated line cards. Similarly, state information for signal S2 working path is initially stored in row 256 of partition D of state memory 219D in DLM (D) 216D, while the state information for signal the S2 protection path is initially stored in row 258 of partition C of state memory 219C in DLM (C) 216C. All DLMs can transmit their information simultaneously, or in a staggered fashion, in the coupled state memory as shown in FIG. 2B, via coupling line 260, which is a point to multipoint bus. However, the present invention is well suited to using any form of architecture that allows state update information between multiple line cards. An example of this alternative architecture would include multi-point to multi-point buses, switched architecture, or switch fabric configured with the appropriate connectivity, etc.

The state memory 219A and logic circuitry 218A are implemented in a field programmable state array (FPGA) in the present embodiment. However, the present invention is well suited to utilizing traditional memory, such as SRAM, DRAM, FLASH, FIFO, dual-port RAM, etc. and using ASIC circuits for the logic circuit. The FPGA is also responsible for providing the input and output ports on the DLM that communicate the state information with other DLMs.

By sharing the state information between all the associated DLMs, the present invention allows local logic circuitry 218A to evaluate the states of all the signals locally, and to analyze, interpret, and aggregate fault indicators locally, and to interrupt its local controller, CPU-A 217A, to change the state, e.g., from active to inactive, of a path being processed by the given DLM, even if a working and protection paths for a given signal is processed by two different DLMs. Thus, if a state change occurs, e.g., a fault, in S1 protection path, that fault state is initially stored in row 254 of partition B of state memory 219B in DLM (B) 216B'. Thereafter, that state information is replicated into shadow memory locations of all other DLMs, including mailbox B' of DLM (A) 216A'. The fault indicators can alternatively change the mailbox state information without intervention of the local controller.

Upon receiving this updated state information, the logic circuitry analyzes whether the row in memory corresponds to a signal whose path has a relationship with the present DLM, e.g., via the use of a check bit in a local FPGA state memory 262 for the given row, and as referenced in subsequent FIG. 3B. If a relationship does exist, then the logic circuitry 218A generates an interrupt to the local controller, CPU-A 217A, which then checks a look up table (LUT) for the specific signal, path, and channel relationship. In the example provided, a LUT entry of link data 215A indicates that the interrupt generated refers to signal S1, which also has a working path of $\lambda_7$ which is in the range ($\lambda_1$ to $\lambda_{10}$) of the present DLM (A) 216A. Consequently, the present DLM (A) 216A will take the necessary action, as indicated by the fault algorithm common to all DLMs, e.g., activating the working path $\lambda_7$ by turning on a laser in the TOM 234 to deliver signal S1 to the client because the state received from DLM (B) 216B indicated that the active protection path for S1 had a laser failure. The state information can for a given path of a given signal can be generated locally, e.g., via the logic circuitry 218A which checks for bit error rates (BER) that would indicate either poor signal performance or a failure such as an upstream laser failure or fiber line breakage. The logic circuitry 218A can directly communicate the state information to local state memory 219A for subsequent processing. The illustration in FIG. 3A will illustrate the state change in the row of state memory in more detail.

In the data plane section of DLM (A) 216A, each client transmitter, handles the transmission of a plurality of different optical client signals combined as a DWDM signal, also referred to as an optical channel group (OCG), is paired in a module, e.g., DLM (A) 216A, with a receiver that handles the reception of a plurality of different optical client signals decombined from a DWDM signal. In the language parlance here, the line side transmitter/receiver module is called a digital line module (DLM) that, in particular, houses photonic integrated circuits (PICs) having plural client signal channels within the semiconductor chips. One of the PICs is an optical transmitter photonic integrated circuit (TxPIC) chip 239 that take client signals, delivered to the DLM (A) 216A from the client side signal source of such signals, generates modulated optical signals via on-chip modulated sources, and then combines the plurality of generated signals, via an on-chip multiplexer, to form a single DWDM signal stream for handoff to the BMM. The client side signal source includes a tributary adapter module (TAM) 232 which is a sub-module of the DLM and is a versatile device that allows the add or drop of client signals from the client equipment connected to the TAM. Also, the tributary optical module (TOM) 234 coupled to the TAM 232 handles, for example 1G, 2.5G or 10G baud rates, and is employed as physical SFP or XFP client interfaces connected to the client network equipment and to the TAMs. Each DLM also supports encapsulation of the client signals into a digital signal wrapper with integrated forward error correction (FEC) in a manner such that the resultant line baud rate established is the same for any and all different baud rate client signals received from the client side signal source. Further, the DLM includes an optical receiver photonic integrated circuit (RxPIC) chip 238 that receives from one of the BMM a DWDM signal which is demultiplexed by an on-chip demultiplexer and the demultiplexed signals are then individually detected by on-chip photodetectors, as shown in a subsequent figure.

The converted electrical signals are then prepared in a format for forwarding on to their client signal destination. Details concerning the PICs and the DLM operations and components can be found in patent application Ser. Nos. 10/267,331, filed Oct. 8, 2002, published on May 23, 2003 as Pub. No. US 2003/0095737 A1; U.S. Pat. No. 7,118,851, issued Oct. 3, 2006; and 11/154,455, filed Jun. 16, 2005, published on Dec. 29, 2005 as Pub. No. US 2005/0286521 A1, all of which applications are incorporated herein by their reference.

Overall, the system described in FIG. 2A provides the local and autonomous fault detection and/or protection switching either directly for signals processed on its line card with states stored in memory, or indirectly to/form signals processed on other line cards, through the use of the shadow memory and updates thereto. The fault and switching algorithms of FIG. 4C are operated on each of the DLMs. In an alternative embodiment, the fault and switching algorithms may be tailored differently to achieve different functionality with different DLMs, providing that the interoperability of these algorithms is harmonious.

Referring now to FIG. 3A, a detail illustration of the partitioning layout of a state memory 219A portion of a line card, corresponding to DLM (A) 216A of FIG. 2B, is shown. State memory 219A has four partitions in the memory corresponding to mailboxes A, B', C', and D'. Each row in state memory 219A is 32 bits wide to accommodate the quantity of state and control bits utilized in the present disclosure. Each mailbox, e.g., A, has 80 rows, or words, available for each channel processed by the DLM. In the present embodiment, the DLM subdivides a given optical channel, e.g., $\lambda_7$, into four electronic sub-channels for electronic processing in FEC 236 and TAM 232 of DLM (A) 216A of FIG. 2B. Based on the subchannels protocol, each DLM will have a total of 40 sub-channels (10 optical channels×4 subchannels/1 optical channel). Thus, a given DLM only requires 40 rows, or 32-bit words, to document the state of each subchannel the DLM processes. The remaining 40 rows are provided for future expansion or interoperability with a larger group of DLM cards. In other words, if double the quantity of DLMs were linked together to provide processing of a working or protection path of a signal, then the state of this expanded set of DLMs would be replicated in each DLM.

The present disclosure is well suited to any memory configuration that allows the state of signals to be recorded in a predictable fashion and shared with the balance of DLMs. While the present disclosure refers to channels or wavelengths in FIGS. 2A and 2B for simplicity, the present invention is well suited to any signal granularity, such as sub-wavelength granularity for protection path switching, provided that the granularity chosen is consistently managed on the appropriate granularity level in the DLM.

Additionally, multiple wavelengths may be associated and processed together with the protective switching of the present disclosure. The multiple wavelength grouping, also referred to as a super wavelength or super lambda, arise for client signals that exceed the capacity of a given carrier wavelength, e.g., 10 Gbps for a given wavelength, such as $\lambda_7$. In particular, state memory, e.g., 219A, would logically identify the multiple wavelengths for a given working or protective path as being associated with a given signal, e.g., by tagging them with an appropriate check bit in the FPGA state memory and by associating the wavelengths together in the LUT of a local controller of the DLM that processes them. In this manner, the present disclosure will effectuate the protective switching of super wavelengths with the present disclosure. For example, if a client signal is routed using "N" multiple of M Gbps wavelengths for some reason, e.g., a 40 Gbps client signal is routed using 4×10 Gbps signals over the long haul network, then these N signals will be evaluated for switching as a group, e.g., the four signals for the given client will be protection switched as a group in order to meet skew tolerances, etc. for the four signals at their destination.

As further alternative embodiments to the present embodiment, note that while FIG. 2A provides signals from two BMMs, BMM C1 214 in shelf 1 210, and BMM C2 224 in shelf 2, only four mailboxes are required in the present embodiment, because all the processing of the signals is accomplished by four DLMs in shelf 1 210, e.g., DLM (A) 216A, DLM (B) 216B, DLM (C) 216C, AND DLM (D) 216D. In an alternative embodiment, if signals from BMM C1 214 and BMM C2 224 were processed by DLMs in both shelves, e.g., shelf 1 210 and shelf 2 220, then an optical patch cable would be required to couple an OCG bandwidth from the BMM in one shelf to the DLM, e.g., OCG $\lambda_{11}$ to $\lambda_{20}$, in another shelf. If the total number of mailboxes from both shelves did not exceed four, then the partitioning shown in FIG. 3A would suffice, though the labels of the DLMs would reflect the specific DLM and the specific shelf where it is located. If the total number of mailboxes processing working or protection path versions of a given signal exceeded four, then additional mailboxes beyond A-D would be used. If excess memory existed in a current state memory portion of the DLM, then the memory could be repartitioned, providing sufficient memory existed. Alternatively, additional memory could be coupled to the DLM to provide modular scalability, providing sufficient ports existed to allow communication of states between the DLMs. To effectuate communicating state update information between all line cards existing in multiple chassis, a communication path would be provided to enable connectivity. This would allow a protection switching association to be set up between any combination of line cards in a multi-shelf, or multi-chassis, system.

Referring now to FIG. 3B, a detail illustration of a row of state memory with exemplary state value bit settings is shown. The example provided is row 1 301A corresponding to mailbox A of state memory 219A of FIG. 3A, which in turn corresponds to DLM (A) 216A of FIG. 2B, in the present example. State and control bit positions 303 have the following designations. The zeroth (0) bit position of the row provides an "active" path state for the given signal. For example, if the active path is set high ("1"), then the subchannel to which the row corresponds is the active path, be it working or protection path, for transmitting the signal at a junction point, e.g., at a node. Else, if the zeroth bit is set low ("0"), then the subchannel to which the row corresponds is the inactive path.

The 'mth' through the 29th bit positions are the "fault" states of the subchannel associated with the row of state memory, examples of which are identified in subsequent Table 1. A no-fault condition is represented by a low bit value ("0"), while a fault condition is represented by a high bit value ("1"). As indicated in FIG. 2B, a local FEC chip 236 can measure signal performance in terms of BER for a given subchannel and communicate that value to local state memory 219A. If a fault condition is present for a given subchannel, local logic will seek to switch the active state with a complementary path for the given signal, as will be explained in the example in subsequent FIG. 3C. The 30th bit indicates the path designation for the subchannel, typically as assigned at initialization for a given signal. A high bit value ("1") for path designation indicates the subchannel is designated as a working path while a low bit value ("0") indicates the subchannel is designated as a protection path. Once a channel, or subchannel, is assigned a designation as working or protection path, it will maintain this designation until the channel is reinitialized, even though its active state may toggle back and forth. The 31st bit position is the "protection on" state of the subchannel associated with the row of state memory. A high bit value ("1") for protection state indicates that a protection path is available, e.g., a duplicative path with acceptable performance, such as no fault, is available for switching purposes.

The various fault states or events identified by status bits reflected in state memory 219 include, but are not limited to, absent equipment related to the communication path, equipment failure, a path fault, a path signal failure (Line side status), a payload fault and a client signal fault. Additional user function control states or events identified by control bits reflected in state memory 219 include, but are not limited to, locking out the working path of a particular signal, locking out the protection path for a given signal, manually switching or selecting the working path for a given signal, manually switching or selecting the protection path for a given signal, and administratively locking the setup or configuration. While the present disclosure details specific fault and control states, these are for illustration purposes only. It is important to note that any discrete state relating to the control or processing of a given signal traveling along a multi-node communication path from one client to another can be represented in memory 219.

Local state memory, e.g., 219A of FIG. 2B, can also include local FPGA state memory whose state information is not replicated across the associated DLMs in the node. In the present illustration, local FPGA state memory bit position 305 include 'x' is utilized to indicate whether a path is "DLM related", meaning a path from a different DLM has a relationship to a path processed by the given DLM, e.g., the paths apply to the same signal. Thus, when working and protection paths are first initialized on a node, the program software will set a check bit in the local FPGA state memory that indicates two paths in different DLMs apply to the same signal, and are therefore related. For example, in FIG. 2B, when a working path for signal S1 is set in DLM (A) and a protection path for the same signal S1 is setup in DLM (B), the DLMs will cross reference each other's states in shadow memory. Therefore, FPGA state memory 262 in DLM (A) 216A will have its check bit set in its mailbox B' for the row entry corresponding to the row of the protection path of signal S1 in DLM (B) 216B, and vice versa. This relational information between DLMs is important for evaluating state fault information provide in shadow memory. If the fault is for a path of a signal that is not processed by the current DLM, then no action need be taken. However, if the fault is for a path of a signal that is processed by the given DLM, then action by the given DLM might be necessary.

Referring now to FIG. 3C, a detail illustration is shown of two rows of state memory, for a working path and a protection path, in an interleaved fashion as they progress through state changes over time to effectuate protective path switching. The illustration is provided for signal S1, which corresponds to signal routing for S1 in FIG. 2A, e.g., as 211W working path for S1 processed on wavelength ($\lambda_7$) on DLM (A), and as 211P protection path for S1 processed on wavelength ($\lambda_{12}$) by DLM (B).

At time T0, the state entries for signal S1 working path 352 for DLM (A) in FIG. 3C indicate that it is active ("1"), it has no faults ("0"), it is designated as the working path ("1"), and that protection is on ("1"). At time T1, for S1 working path 352, the state entries indicate that a fault ("1") has arisen. This state information, initially recorded in a mailbox A of FIG. 2B because the S1 working path is processed on wavelength ($\lambda_7$) in DLM (A), is subsequently communicated at time T2 to shadow mailbox A' in all other DLMs, including DLM (B) 216B which processes the complementary path, e.g., the protection path, for signal S1 on wavelength ($\lambda_{12}$). Thus, DLM (B) would be interested in knowing that the working path for the signal S1 it processes as a protection path had a fault in another DLM. Back to FIG. 3C, a time delay between T1 and T2 is needed for the automatic update of states to occur between S1 work path 352 DLM (A) and S2 protection path 354 on DLM (B), via the coupling arrangement between state memory in the DLMs, as shown in FIG. 2B. Local logic 218B in DLM (B) 216B of FIG. 2B identifies the fault state of the working path for signal S1, as relevant that DLM, via a check bit in an 'x'th bit position in FPGA state memory. Because this fault condition affects a path of a signal processed by DLM (B) 216B, the local logic 218B interrupts local CPU-B 217B to change the state of protection path of signal S1, processed on the DLM on wavelength ($\lambda_{12}$), to an "active" state of "1", as shown.

At time T3 the updated state values for signal S1 Protection Path 354 on DLM (B) have been communicated to shadow memory in DLM (A). And because a check bit is set for the shadow memory B' in DLM (A) corresponding to this row in its mailbox, DLM (A) knows that a change in state for that row will affect a signal that it processes. Thus, DLM (A) responds to the fact that S1 protection path is now active in DLM (B), and DLM (A) deactivates the state of its working path for signal S1. Overall, the sequence of state changes within a DLM and the communication of state changes between state memory, e.g., DLM (A) and DLM (B), in this example serve to illustrate the efficient and reliable method of managing automatic protection switching of the present disclosure.

Referring still to FIGS. 3A-3C in general, for protection bus communication, a 32 bit wide state memory, e.g., mailbox, or protection-mbox, for each DLM in the same chassis. The FPGA chip will shadow the content of mailboxes of a DLM to the other three DLMs. It will also interrupt a DLM CPU if the content of these mailboxes is changed for a signal processed by itself or by another DLM as a working or protection path where the same signal is also processed by the present DLM as a working or protection path. Faults that are detected by equipment will toggle the status of a fault bit as shown in Table 1. Control bits are set by a system operator. As previously indicated, the protection switching among the plurality of DLMs can be triggered by network equipment faults, including equipment not present, facility fault, due to operator or technician action.

Figure 4A:
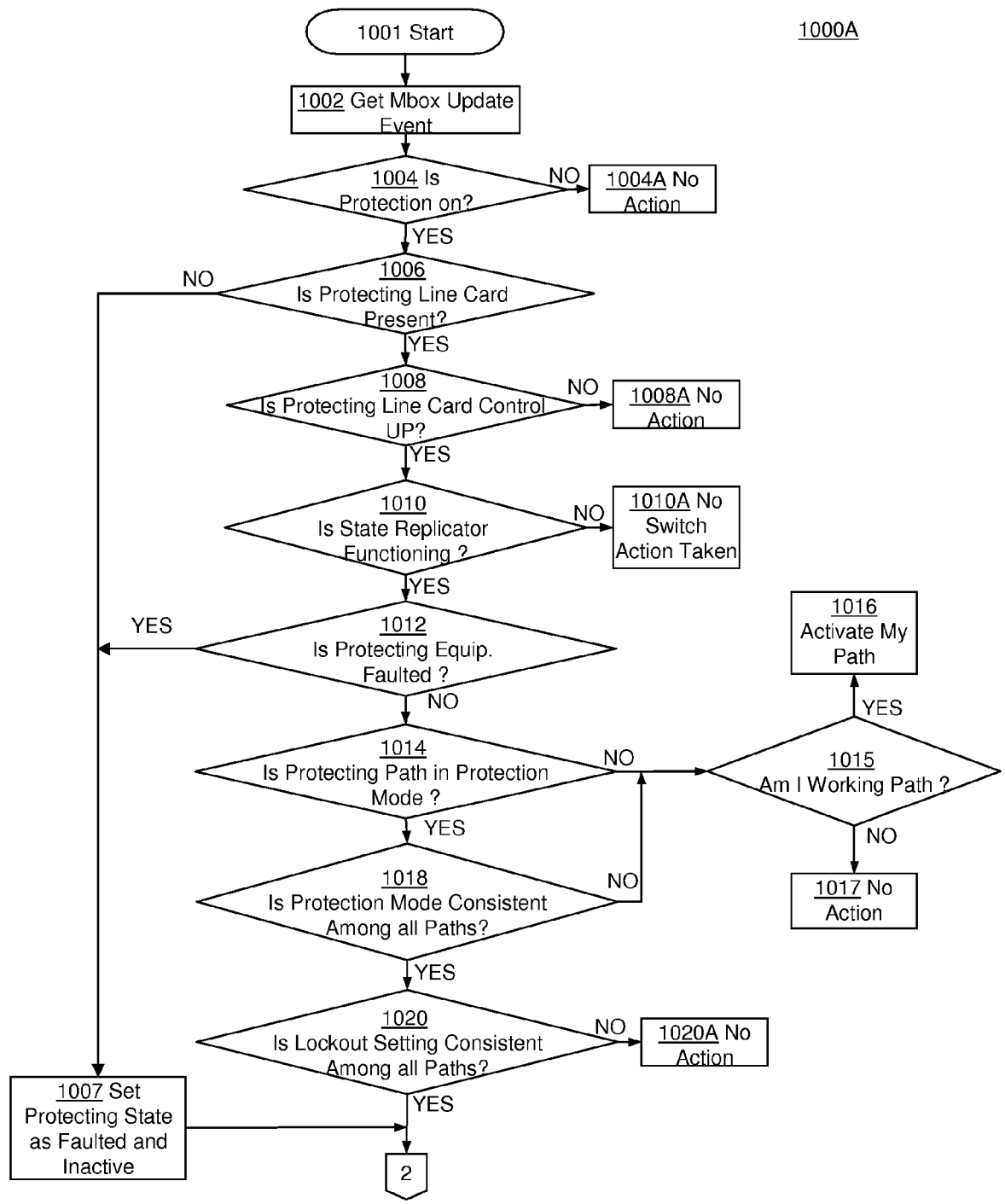
FIGS. 4A-4C are a flowchart of a process for detecting faults in a signal and for protection path switching the communication path of the signal within a communication network.
Figure 4B:
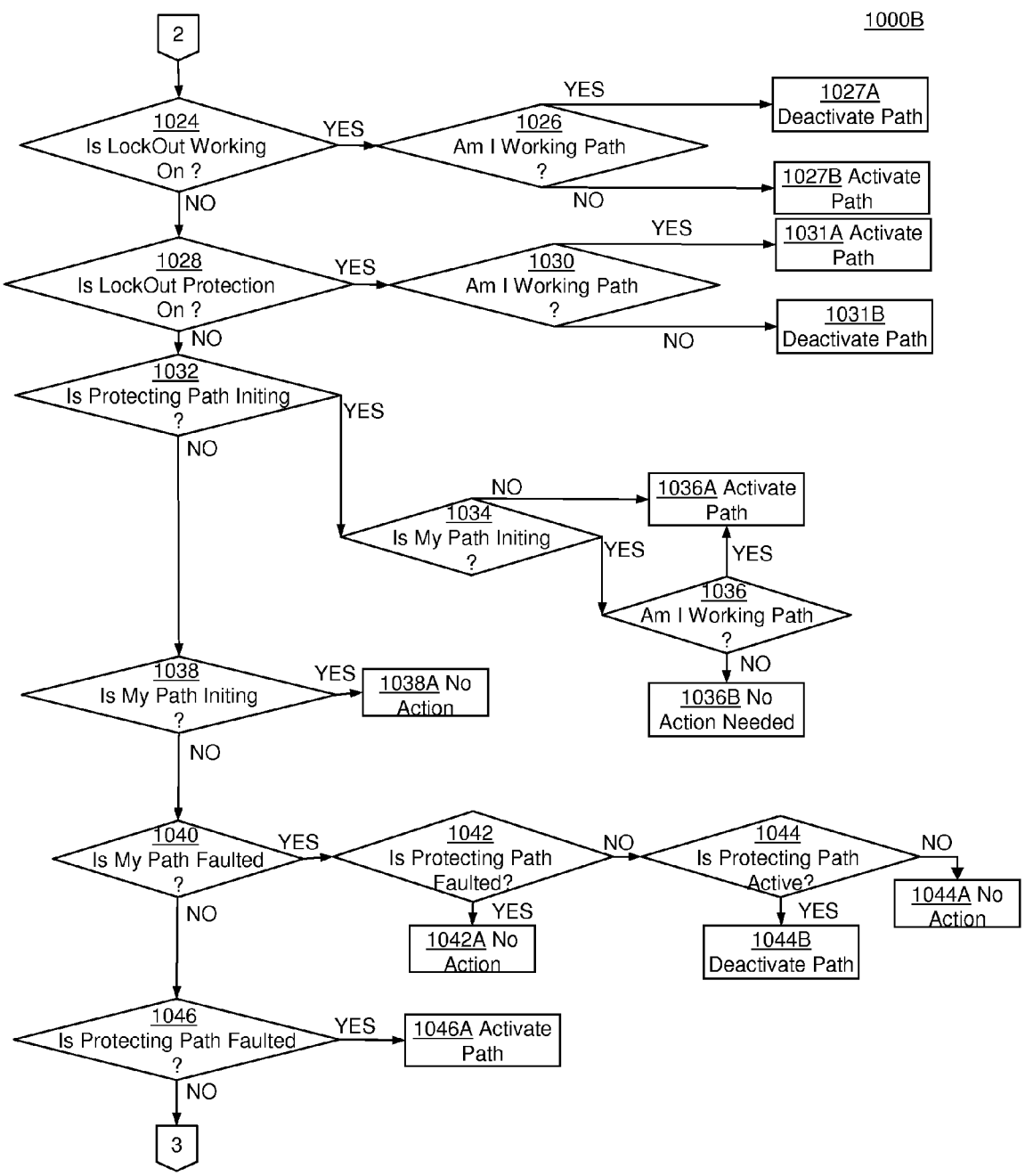
Figure 4C:
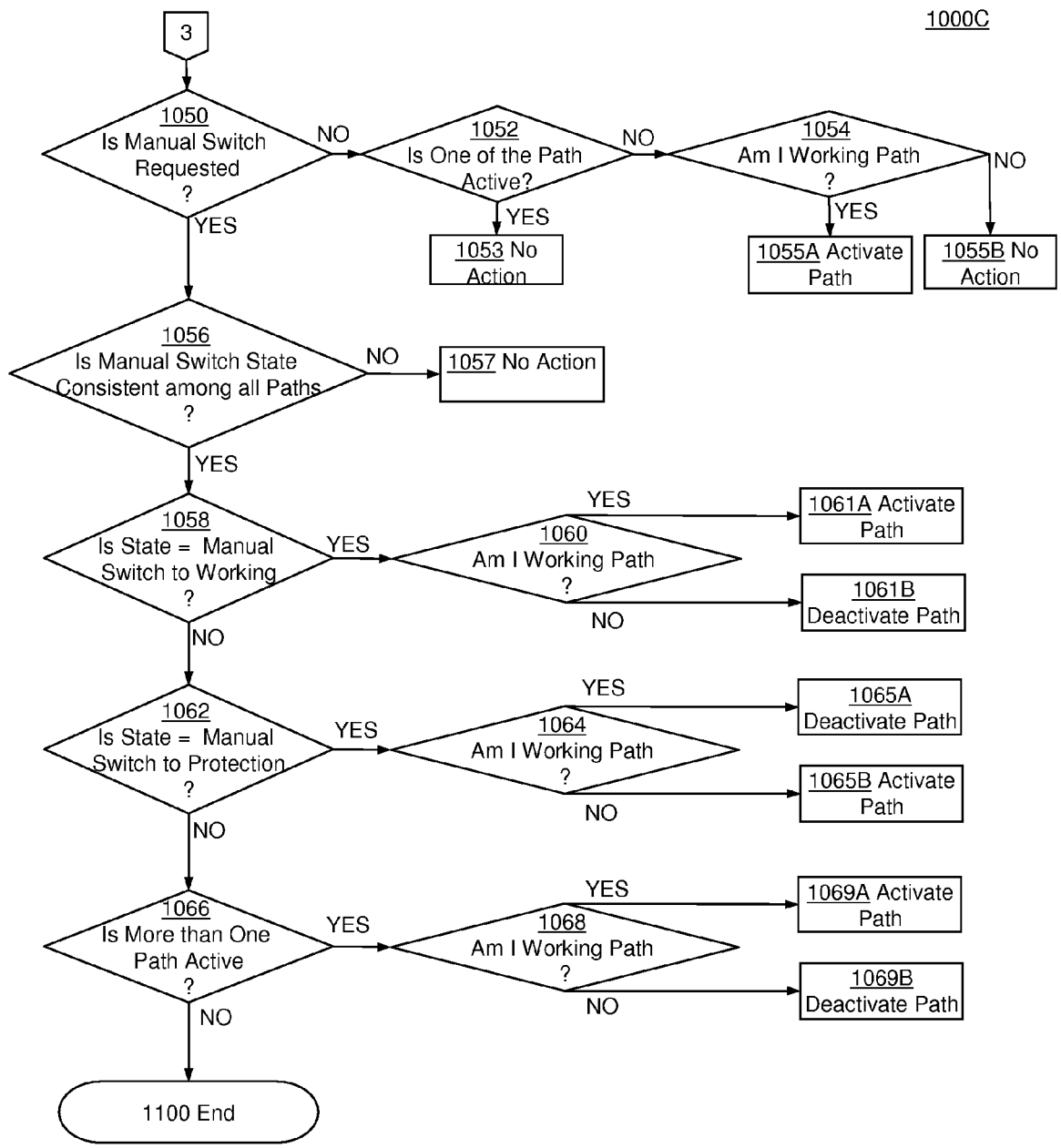

Referring now to FIGS. 4A-4C, a flowchart of the process for detecting faults in a signal and for protection path switching the communication path of the signal within a communication network is shown. In one embodiment, flowchart 1000, e.g., 1000A-1000C, is implementable in node A 102, and in particular, the decisions are implementable in the FPGA logic circuitry 218A and/or the local CPU-A 217A, while fault and performance values can be implemented in the data plane hardware such as the forward error correction (FEC) 236 and tributary adapter module (TAM) chips. While flowchart 1000 illustrates specific conditions and sequences, the present invention is well-suited to the many possible variations of fault detection and correction that can be implemented in the flexible. Typically when flowchart 1000 identifies equipment as nonfunctional, or a fault has arisen, then an alarm will be provided to the operator, or a path will be switched and a resultant state bit changed, is individually indicated in the appropriate steps in the flowchart. Many of the faults evaluated in flowchart 1000 are common to a communication system, and would be understood by one of skill in the art. The term 'my path' or 'path in question' indicates the path processed by a DLM, e.g., as a data path, that is also undergoing this fault and protection path switching algorithm by the DLM per flowchart 1000. The term "protecting", as in protecting path and protecting equipment, indicates the complementary path to 'my path'. Thus, if a path processed on a given DLM is a work path, then the protecting path will be the protection path, and vice versa.

Flowchart 1000A begins with step 1002, receipt of mailbox update event. This is the DLM to DLM communication of updated state information. Steps 1004 and 1006 determine availability of protection equipment and path setting. If an inquiry is affirmative in this set of steps, then the flowchart proceeds to the next step. In particular, Step 1004 inquires whether protection is on for the noted signal. If protection is not on, then protective switching is not available and the evaluation ends with step 1004A no action. Step 1006 inquires whether a protecting line card is present. If not, then in step 1007, the protection state is set as faulted and inactive, and the process continues to step 1024, skipping consistency checks in steps 1014-1020.

Steps 1008 thru 1012 detects whether overall communication, e.g., of state information, between the two separate line cards is working. In step 1008, an inquiry determines whether protecting line card control is up and functioning. If not, then no action step 1008A arises similar to no action step 1004A. Step 1010 inquires if the state replicator is functioning (e.g., state communication architecture between DLMs, e.g., as described in FIG. 2B). If not, then no switch action is taken because if the state replicator cannot replicate the state, then the states may be stale, and reliable switching is less likely. In step 1012, an inquiry determines whether protecting equipment is faulted. If so, then step 1007 is implemented as previously described.

Steps 1014-1020 provide consistency checks of the state information dealing with protection switching, to prevent a glitch. For example, a consistency check confirms whether the two paths are configured consistently, e.g., two paths for the same signal aren't both trying to be active or both trying to be a work path, and if the lockout request, where the path is not available, is consistent with path settings. In particular, step 1014 inquires if protecting path is in protection mode, and if not, then inquiry 1015 asks if the path in question is a working path. If yes, then the working path is activated. Else, no action required per step 1017. Step 1018 inquires whether protection mode is consistent among all paths. If not, then steps 1015-1017 are repeated in order to set a default active path as the working path. Step 1020 inquires whether the lockout settings are consistent among all paths. If yes, then no action is required per step 1002A. Else proceed to step 1024.

Steps 1024-1028 process a lockout request from a system operator/administrator. In particular, step 1024 inquires whether the operator desires to lockout the working path. If so, then step 1026 inquires whether the path in question is indeed the working path, and if so, then it is deactivated in step 1027A, else the path is activated in step 1027B. If the operator did not want to lockout the working path per step 1024, then step 1028 inquires whether the operator wants to lockout the protection path, and if so, inquiry 1030 determines whether the path in question is a working path. If it is, then step 1031A activates the path because it is not the path to be locked out. Else, step 1031B assumes the path in question must be a protection path that is desired to be locked out.

Steps 1032-1038 deal with conditions of initializing my path and the protecting, or complementary, path. In particular, step 1032 inquires if the protecting path is initializing, and if so, then inquiry 1034 asks if the path in question, e.g., my path, is initializing, and if not, then the path in question is ready for transmission and is activated in step 1036A. If the path in question is still initializing in step 1034, then inquiry 1036 asks if the path in question is the working path. If it is, then the path is activated in step 1036A, seeing it is identified as the working, or preferred, path. Else, no action is needed in step 1036B as the path in question is logically the protection path. Inquiry 1038 arises if step 1032 determined that the protecting path is initialized. Inquiry 1038 determines whether the path in question is initializing, and if it is then no action is needed per step 1038A.

In steps 1040-1046 deals with facility fault in the path of the signal. Step 1040 inquires whether the path in question is faulted, and if it is, inquiry 1042 determines whether the protecting path is faulted, with an affirmative determination resulting in no action required per step 1042A. In step 1044, if the protecting path is determined to be active, then step 1044B deactivates the path, as it has been identified as having a fault, else no action is required per step 1044A. If path in question is not faulted per inquiry 1040, then step 1046 determines if the protecting path is faulted, and if it is, then the path in question will be activated in step 1046A.

Steps 1050-1062 deal with manual switching, e.g., as selected by an operator or user in the system. Manual switching toggles the active status of working or protection paths, e.g., for performing maintenance on a desired path, where the path would still be available for switching if the active path faulted. In particular, step 1050 inquires whether the manual switch is requested, and if not, then step 1052 inquires if one of the paths, working or protection, is active. If one of the paths is active, then no action is required. Else step 1054 inquires whether the path in question is the working path, with the path in question being activated if it is the working path; else no action is needed per step 1055B. Step 1056 inquires whether the manual switch state is consistent among all paths, with a negative determination resulting in no action per step 1057. If a configuration state is inconsistent, the present embodiment typically does not take action, as indicated in the flowchart, but rather chooses to wait for the configuration state to settle to a consistent state, and to be confirmed in the next state update between DLMs. Step 1058 inquires where the desire is to manually switch the working path to the active state, and if so, then step 1060 inquires whether the path in question is the working path. If the path in question is indeed the working path, then step 1061A activates the path in question, else step 1061B deactivates the path in question. Step 1062 arises if the current state does not indicate the manual switch is to the working path per step 1058. Step 1062 inquires whether the desire is to manually switch the protection path to the active state, and if so, step 1064 inquires whether the path in question is the working path, with a negative response resulting in step 1065B activating the path, which logically must be the protection path, else step 1065A deactivates the path in question.

Step 1066 is a consistency check, inquiring whether more than one path is active, e.g., a glitch. If more than one path is active, then step 1068 inquires whether the path in question is the working path, with an affirmative determination resulting in step 1069A activating the work path, as the default preferred path, and a negative determination resulting in step 1069B which deactivates the path in question, which logically must be the protection path.

The protection switching decision is done independently by the two DLM CPUs based on its own status and the protecting path state information. Given the same input, this logic circuitry should yield the same decision on both DLMs. To make sure that the mailbox has been properly setup before they are scrutinized by another DLM, the following functions need to be performed. First, if a DLM fails diagnostic testing, then all paths will be marked with an equipment failed state prior to starting the state replicator for the faulted DLM. Second, if the paths successfully boot-up, then all the mailboxes should be setup correctly before starting the state replicator. The FPGA chip in the logic circuitry needs to retain the mailbox registers across warm boot.

Overall the present disclosure provides the apparatus, methods, and functionality to achieve the local and autonomous fault detection and/or protection switching for network communications. The present invention is well suited to electrical and optical networks, including DWDM, CWDM, and single wavelength systems.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

We claim:

1. A network node comprising:
    a client interface that receives a client signal carrying data at a first rate;
    first and second line modules, the first line module being configured to supply a first plurality of optical signals, each having a corresponding one of a first plurality of wavelengths, to a first path, each of the first plurality of optical signals carrying information corresponding to one of a plurality of portions of the data, each of the first plurality of optical signals carrying the information at a second rate less than the first rate, the second line module being configured to supply a second plurality of optical signals, each having a corresponding one of a second plurality of wavelengths, to a second path, each of the second plurality of optical signals carrying the information corresponding to said one of the plurality of portions of the data, each of the second plurality of optical signals carrying the information at the second rate, the first plurality of wavelengths being different than the second plurality of wavelengths;
    first and second CPUs provided in the first and second line modules, respectively, the first CPU being configured to change a state of the first path from a protection state to a working state;
    first and second memories included in the first line module, and first and second memories provided in the second line module; and
    a communication bus coupled to the first and second memories in the first line module and the first and second memories in the second line module, such that first state information associated with the first path is stored in the first memory in the first line module and supplied over the communication bus to the first memory in the second line module, and second state information associated with the second path is stored in the second memory in the second line module and supplied over the communication path to the second memory in the first line module, wherein the first state information indicates that the first path is a working path, the first and second memories further store a common identifier associated with the first and second plurality of optical signals, such that, in response to a fault in the first path and based on the common identifier, the first and second CPUs cooperate to deactivate transmission of the first plurality of optical signals on the first path activate transmission of the second plurality of optical signals on the second path.

2. The network node of claim 1, wherein of the first and second memories in the first line module includes a plurality of memory portions.

3. The network node of claim 1, wherein each of the first and second memories in the first line module further includes first and second logic circuits for controlling the supplying of the first and second state information from the first and second memories, respectively.

4. The network node of claim 1, wherein the communication bus is a point-to-point bus or a point-to-multipoint bus.

5. The network node of claim 4, wherein the communication bus includes two or more point-to-point buses or two or more point-to-multipoint buses.

6. A network node comprising:
a client interface that receives a client signal carrying data at a first rate;
a first line module configured to supply a first plurality of optical signals, each having a corresponding one of a first plurality of wavelengths, to a first path and to generate a first state information associated with the first path, each of the first plurality of optical signals carrying information corresponding to one of a plurality of portions of the data, each of the first plurality of optical signals carrying the information at a second rate less than the first rate;
first and second memories provided in the first line module;
a second line module configured to supply a second plurality of optical signals, each having a corresponding one of a second plurality of wavelengths, to a second path and to generate second state information associated with the second path, the first plurality of wavelengths being different than the second plurality of wavelengths, each of the second plurality of optical signals carrying the information corresponding to said one of the plurality of portions of the data, each of the second plurality of optical signals carrying the information at the second rate;
first and second memories provided in the second line module, the first memory in the first line module and the first memory in the second line module storing the first state information, the second memory in the second line module and the second memory in the second line module storing the second state information;
first and second CPUs provided in the first and second line modules, respectively, such that first and second CPUs being configured to change a state of the first and second paths, respectively; and
a communication bus coupled to each of the first and second line modules, wherein the first state information indicates that the first path is a working path, the first and second memories further store a common identifier associated with the first and second plurality of optical signals, such that, in response to a fault in the first path and based on the common identifier, the first and second CPUs cooperate to deactivate transmission of the first plurality of optical signals on the first path activate transmission of the second plurality of optical signals on the second path.

* * * * *